May 4, 1937. B. FRANCISCI 2,079,115
SYSTEM FOR RECORDING SOUND PHOTOACOUSTICALLY ON CINEMATOGRAPH FILM
Filed March 28, 1934 2 Sheets-Sheet 1

INVENTOR
BRUNO FRANCISCI
BY
ATTORNEYS

May 4, 1937.  B. FRANCISCI  2,079,115
SYSTEM FOR RECORDING SOUND PHOTOACOUSTICALLY ON CINEMATOGRAPH FILM
Filed March 28, 1934   2 Sheets-Sheet 2
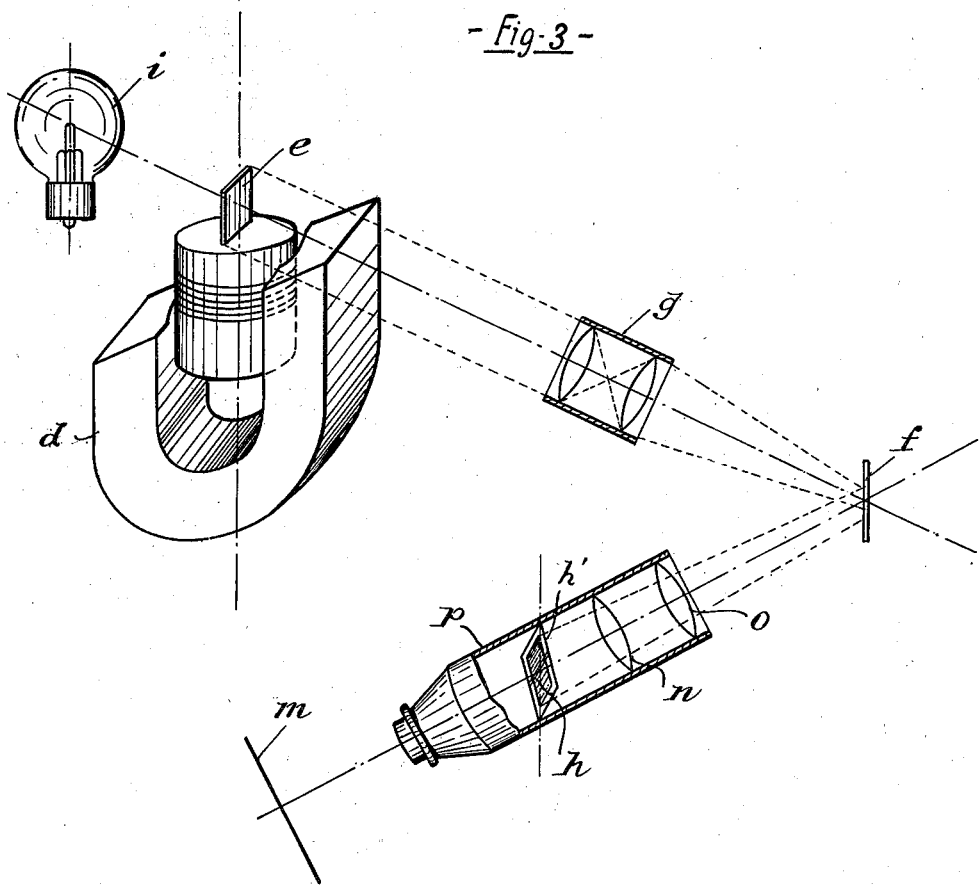
INVENTOR
BRUNO FRANCISCI
BY
Richards & Geier
ATTORNEYS Patented May 4, 1937

2,079,115

UNITED STATES PATENT OFFICE 2,079,115

SYSTEM FOR RECORDING SOUND PHOTO-ACOUSTICALLY ON CINEMATOGRAPH FILM

Bruno Francisci, Rome, Italy

Application March 28, 1934, Serial No. 717,725
In Germany and France February 24, 1934

5 Claims. (Cl. 274—5)

The invention relates to systems for recording sound on cinematograph films photo-acoustically.

Systems are already known for recording sound on cinematograph films which are based on the variations of luminous intensity of a lamp and in which there is utilized for recording the sound, the entire acoustic band. With these systems, there is, however, the disadvantage that the inertia or lag of the lamp only permits efficiency and sure and certain operation over a limited range of frequencies.

The present invention has for its object to provide improvements in the said systems for recording sound on cinematograph films in which there is employed a true or optical shaded screen for the recording of sound by intensity variation on cinematograph films in conjunction with a galvanometer or electro-magnetic or electro-dynamic modulator, whereby the disadvantages indicated above are completely eliminated.

The present invention permits perfectly satisfactory results to be obtained by projecting on the small oscillating mirror of a galvanometer, a screen of which the transparency is shaded from complete opacity to complete transparency, or the graded shadow of the upper edge of an opaque rectangular plate situated in place of the screen.

There are also obtained, according to the invention, satisfactory results by employing, instead of a galvanometer, an electro-dynamic or an electro-magnetic modulator connected to a shaded screen or to an opaque strip situated in place of the screen.

In the first case the shaded screen is projected in focus on an optical refracting system which transmits the image of the screen to the recording slit. In the second case the upper edge of the opaque strip is projected out of focus on the optical refracting system which transmits it to the recording slit.

The invention is illustrated by way of example only and in a non-limitative manner in the accompanying drawings, in which:—

Fig. 3 shows another embodiment of the invention in which an electro-dynamic modulator is employed in association with an opaque rectangular strip.

Figure 1:
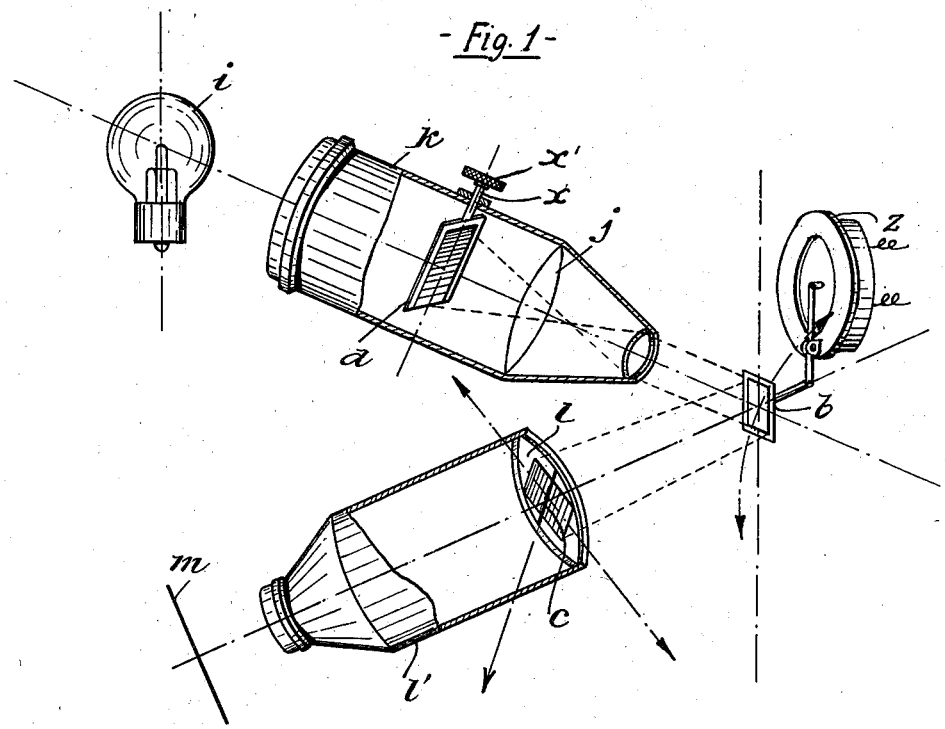
Fig. 1 shows an embodiment of the invention making use of the true screen and of a galvanometer.
Figure 2:
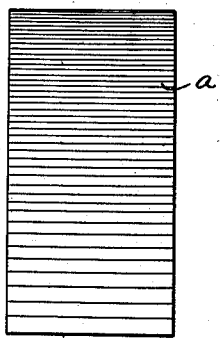
Fig. 2 is a front view, on a larger scale, of the said true screen of graded transparency.

The device shown in Fig. 1 comprises a shaded screen $a$ which is illustrated separately in Fig. 2 and which is situated within a projector $k$. As indicated in the drawings, the screen $a$ is shaded progressively from a maximum of transparency to a maximum of opacity. The screen $a$ is connected with a bolt $x$ having a handle $x'$ situated outside of the projector $k$ and used for adjusting the position of the shaded screen $a$ in relation to the entire optical projection system. The light of a lamp $i$ strikes the shaded screen $a$ and projects the image of the screen through a lens $j$ situated within the projector $k$ upon a small oscillating mirror $b$ connected to a sound-responsive device $z$ of the conventional type. The mirror $b$ reflects the image of the screen $a$ upon a plate $l$ provided with an elongated aperture $c$ situated within a projector $l'$. A small part of the reflected image passes through the aperture $c$ provided in the plate $l$ and is recorded upon the film $m$. In the state of repose of the small oscillating mirror $b$, the projection of the screen on the recording aperture may be such that the mid-part of the said screen is presented to the said aperture in such a way that the mean intensity of the progressive shading of the screen relatively to the intensity of the source of light may be capable of printing an even grey on an ordinary cinematograph film $m$ passing at the normal speed and with normal development.

As soon as the small mirror $b$ commences to oscillate, the angle of projection of the incident ray changes to one side or the other of the recording slit which is thus illuminated more or less intensely according to the volume of recording, by darkening the sensitive layer of the film with more or less intense lines. In the modulation the displacement of the shaded screen on the recording slit should never exceed the limits of complete opacity or of complete transparency or, in the case where these limits are exceeded, they should have exactly equal results on the two sides.

In the embodiment indicated on Fig. 3 there is provided in place of the galvanometer, an electro-dynamic modulator $d$ associated with an opaque strip $e$. The shaded screen $a$ of Fig. 1 is here replaced by the out-of-focus projection of the upper edge of the opaque blade $e$ which is connected to the modulator on a fixed optical reflecting system $f$ by means of a suitable optical concentrating device $g$.

From the reflecting system $f$ there is transmitted to the aperture $h$ a plate $h'$ through lenses $n$ and $o$ of an ordinary optical projector $p$ the penumbra due to the lack of illumination, which also has a maximum of complete opacity and a maximum of complete transparency as has already been indicated for the shaded screen in the embodiment of Fig. 1.

The embodiments illustrated and described are adapted to be varied within the scope and limits of the claims of the present application.

Having now thus described my invention, what I claim and desire to cover by Letters Patent is:

1. In a system of photographic sound recording of the intensity variation type, the combination with a light source and a sound responsive device; of a projector adapted to project a beam of light upon a light sensitive member, said projector having a narrow aperture for admitting light, reflecting means for directing on said aperture a beam of light the intensity of which is gradually shaded off crosswise of said aperture and separate means associated with said sound responsive device for causing said beam to oscillate lengthwise of said light sensitive member.

2. In a system of photographic sound recording of the intensity variation type, the combination with a light source and a sound responsive device; of a projector adapted to project a beam of light upon a light sensitive member, said projector having a narrow aperture for admitting light, a mirror for reflecting a light beam from the light source onto said aperture and sound responsive means arranged in the path of said light beam and associated with said sound responsive device for causing a gradual shading off in intensity, cross-wise of said aperture and for causing said light beam to oscillate lengthwise of said light sensitive member.

3. In a system of photographic sound recording of the intensity variation type, the combination with a light source and a sound responsive device; of a projector adapted to project a beam of light upon a light sensitive member, said projector having a narrow aperture for admitting light, a mirror for reflecting a light beam from the light source onto said aperture, means arranged in the path of said light beam for causing a gradual shading off in intensity crosswise of said aperture, and separate means associated with said sound responsive device for causing said mirror to oscillate whereby said light beam is caused to oscillate lengthwise of said light sensitive member and whereby a uniform sound track of intermittent light and shaded areas corresponding to the oscillations of said mirror is produced on said light sensitive member.

4. In a system of photographic sound recording of the intensity variation type the combination with a light source and a sound responsive device; of a mirror, adapted to be oscillated by said sound responsive device, means of unequal transparency disposed intermediate said light source and said mirror and means for concentrating to a band the rays penetrating said means of unequal transparency onto said mirror, and a projector having a narrow aperture for receiving the rays reflected from said mirror and adapted to project said rays on a light sensitive member.

5. In a system of photographic sound recording of the intensity variation type, the combination with a light source and a sound responsive device; of a mirror, an opaque member adapted to be oscillated by said sound responsive device arranged intermediate said mirror and the light source, means for concentrating to a band the penumbra produced by said opaque means onto said mirror and a projector having a narow aperture for receiving the rays reflected by said mirror and adapted to project said rays on a light sensitive member.

BRUNO FRANCISCI.